Aug. 15, 1972    G. BEARDMORE ET AL    3,684,678
METHODS OF MACHINING

Filed Feb. 16, 1970    3 Sheets-Sheet 1

GEOFFREY BEARDMORE
HUGH N. EVANS by Hall, Pollock & Vande Sande

United States Patent Office 3,684,678
Patented Aug. 15, 1972

3,684,678
METHODS OF MACHINING
Geoffrey Beardmore, 20 Oak Manor Drive, and Hugh N. Evans, The Wyastone Hotel, Parabola Road, both of Cheltenham, Gloucestershire, England
Filed Feb. 16, 1970, Ser. No. 11,795
Claims priority, application Great Britain, Feb. 21, 1971, 9,456/69
U.S. Cl. 204—192
12 Claims

ABSTRACT OF THE DISCLOSURE

The spiral grooving of a thrust-plate of an aerodynamic gas-lubricated bearing is formed by sputtering material from a masked blank, and surface-finishing within the grooving is achieved by cyclic reversal of the sputtering process so that material is alternately removed from and deposited within the grooves.

---

This invention relates to methods of machining, and also relates to articles manufactured using such methods.

The invention is concerned especially with methods of ionic-machining, that is to say, with methods in which a workpiece is subjected to ionic bombardment so as to sputter material therefrom.

According to one aspect of the present invention there is provided a method of machining in which surface-finishing of a workpiece is performed by repeatedly reversing a process of sputtering such that removal of material from a surface of the workpiece is alternated with deposition of material thereon.

The step of repeatedly reversing the sputtering process is of particular advantage in the provision of a high standard of surface-finish or polish to the workpiece. In this respect the step may be performed to follow a period of continuous sputtering of material from the workpiece.

The method of the present invention is readily applicable to the accurate machining of grooves and other cavities of restricted access, in workpieces of hard materials. Although advances in conventional machining methods have in general enabled high standards of surface-finish to be obtained over extended surfaces in hard materials, there is still difficulty in obtaining these standards within restricted cavities; the method of the present invention enables the surface-finishing of restricted cavities to be carried out to standards comparable with those obtainable over extended surfaces.

This invention, especially in the context of the immediately-preceding paragraph, is applicable to the manufacture of bearing-parts of gas-lubricated bearings. Although the invention is not limited to this specific application and may be used in the manufacture of other articles, there is provided in accordance with a feature of the invention a method of manufacturing a grooved bearing-part of a gas-lubricated bearing, wherein a blank of the bearing-part is submitted to ionic bombardment to form grooves therein by the sputtering of material from the blank, and wherein during a final phase of the method the process of sputtering material from the blank is reversed cyclically so that material is alternately sputtered from and deposited on the blank within the grooves. The method of providing the grooves by ionic bombardment has been found to be particularly advantageous in that very accurate control of groove-depth can be obtained simply by regulating the time for which sputtering continues. Furthermore, the surface-finish that is obtainable is of a very high standard appropriate to precise gas-bearing requirements.

According to a further feature of the present invention a method of manufacturing a grooved bearing-part of a gas-lubricated bearing, comprises the step of masking a surface of the blank in accordance with the grooving required in the bearing-part, the masking leaving areas of said surface exposed where grooves are required, the step of positioning the mask blank within an enclosure, the step of establishing a gaseous atmosphere of reduced pressure within said enclosure, the step of discharging electrons in said atmosphere to establish a plasma within said enclosure, the step of applying voltage in a sense to attract ions from said plasma to bombard the exposed areas of the masked blank such as to sputter material therefrom, and the step of reversing the sense of said voltage cyclically throughout a final phase of the sputtering process.

A method of manufacturing a grooved bearing-part of an aerodynamic gas-lubricated bearing, which method includes ionic machining according to the present invention, will now be described, by way of example, with reference to the accompanying drawings, in which.

Figure 1:
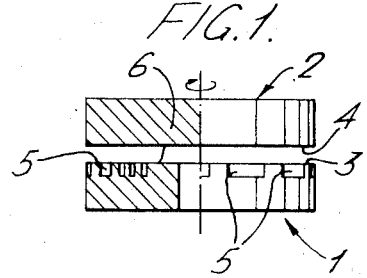
FIG. 1 is a part-sectional side-elevation of the aerodynamic gas-lubricated bearing.

The form of aerodynamic gas-lubricated bearing shown in FIG. 1 is for use in the provision of a rotational mounting at either end of the rotor of a gyroscope, and the method will be described more specifically as used in the batch-production of one of the two thrust-plates of the bearing.

Figure 2:
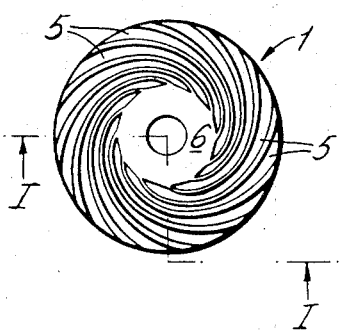
FIG. 2 is a plan view of the grooved bearing-part of the bearing shown in FIG. 1, the section of FIG. 1 being taken on the line I—I of FIG. 2.

Referring to FIGS. 1 and 2, the aerodynamic bearing comprises two circular plates 1 and 2 that have opposed bearing-surfaces 3 and 4 respectively. The surface 3 of the plate 1 is provided with a series of shallow grooves 5 of logarithmic-spiral pattern, extending from the edge of the plate 1 to a central land 6, whereas the surface 4 of the plate 2 is plain. Relative rotation between the plates 1 and 2 in the sense to cause air to be dragged inwardly along the grooves 5 establishes pressure that balances the axial load exerted between the plates 1 and 2. The balance is established with a spacing of only a few tenths of a thousandth of an inch between the plates 1 and 2, and in order to achieve this it is desirable for the surfaces within the grooves 5, and for the surfaces 3 and 4, to have as high a degree of flatness as possible. The surfaces 3 and 4 additionally need to be resistant to wear and other damage arising from their contact with one another when the gyroscope-rotor is stationary and from the rubbing of one upon the other when rotation begins.

The requirement for resistance to wear and other damage implies hardness, and although advances in conventional machining methods have enabled accurate surface-flatness in hard, wear resistant materials, to be achieved over extended plane faces they do not readily allow for the same high standards to be achieved within restricted cavities such as the grooves 5 of plate 1. The requirement for accurate grooving with a high degree of surface-finish is readily met in the present instance, however, using a method in which the optically-flat surface of a blank composed of the required hard, wear-resistant material, is subjected to ionic bombardment to cut the grooves and then to a process of alternate sputtering and deposition of material within them to improve their surface-finish. The wear-resistant material used in this example is of a hot-pressed sintered form, circular discs of this material being machined down by conventional methods to the overall dimensions required of the plates 1 and 2 and to provide on the plain faces a surface flatness of less than one light band C.L.A. (that is to say, less than ten micro-inches, centre-line average).

Figure 3:
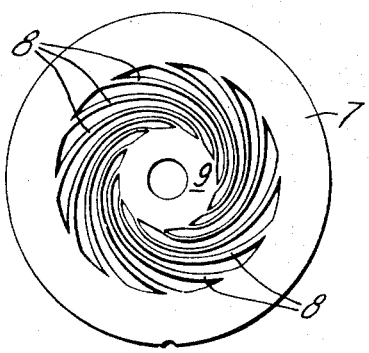
FIG. 3 is a plan view of a mask used in the method of manufacture of the bearing-part shown in FIG. 2.

The machined discs are in general useable directly in the provision of the plain plate 2 of the bearing and also as the blank from which to derive the grooved plate 1 by ionic machining. The ionic machining of the blank is performed through an annealed Phosphor Bronze, or beryllium-copper, mask of the form shown in FIG. 3. This mask, which has a thickness of $5 \times 10^{-3}$ inch, has an outer rim 7 supporting narrow spiral-arms 8 extending from a central area 9 so that when it is clamped to the face of a blank it leaves exposed only those areas where grooves 5 are required.

Figure 5:
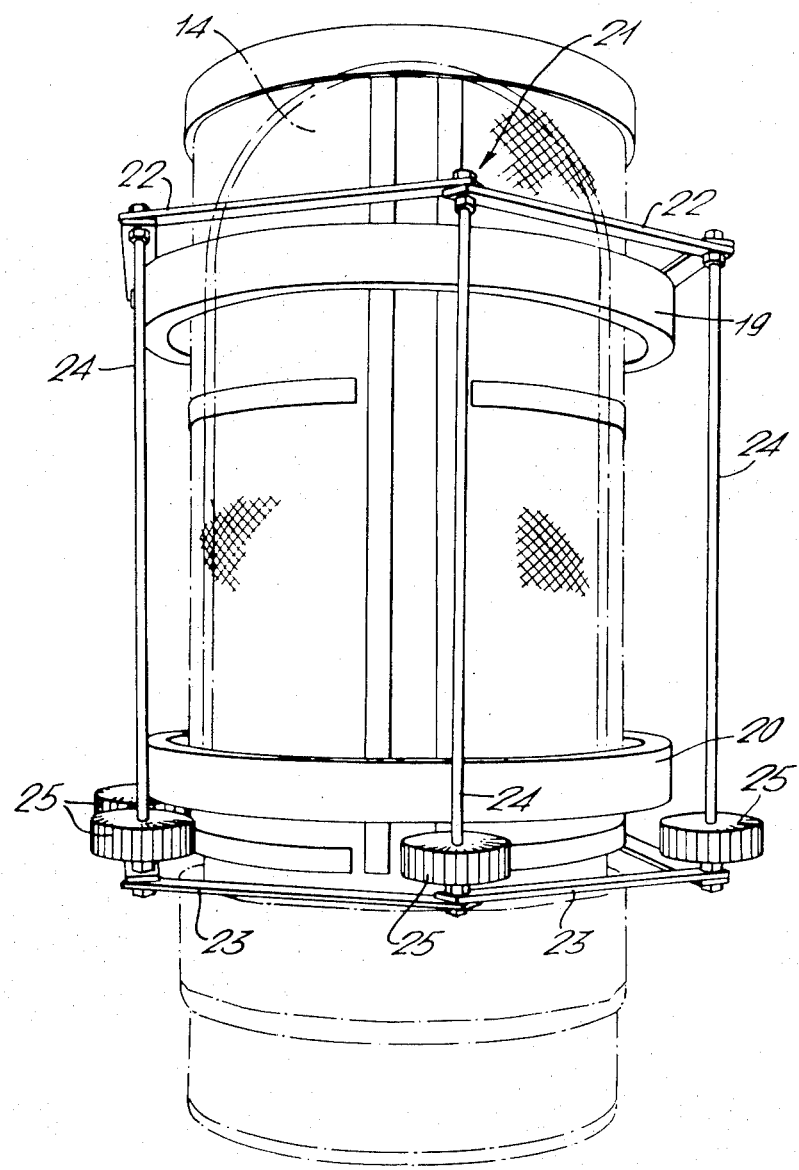

The ionic machining of the blank, is performed using the apparatus of FIGS. 5 and 5, a batch of some two hundred blanks being dealt with at a time.

Figure 4:
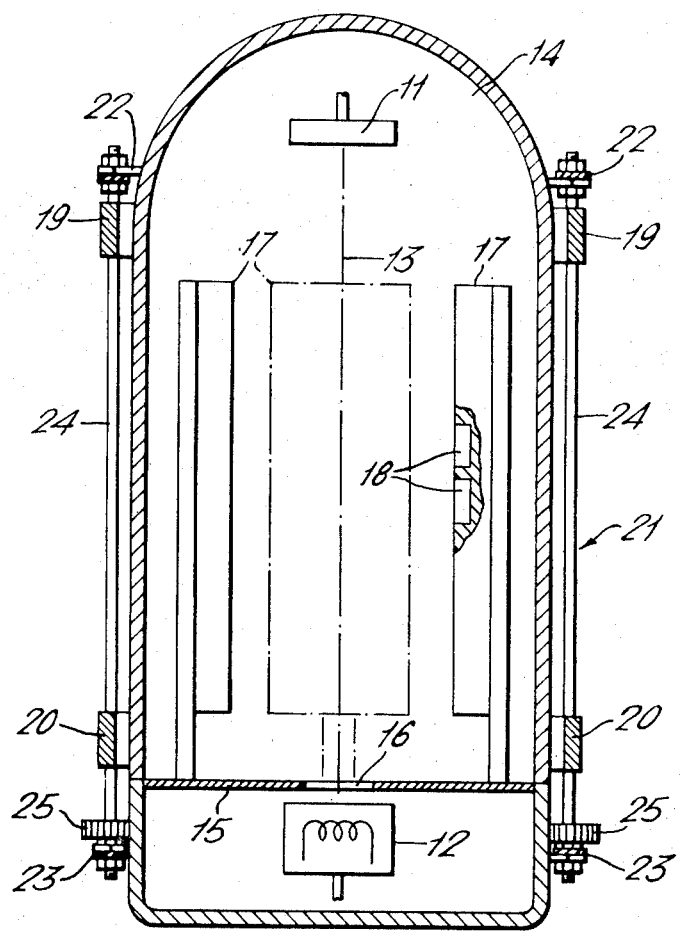
FIGS. 4 and 5 are respectively a sectional representation and an external view of sputtering apparatus used in the method.

Referring to FIGS. 4 and 5, the apparatus has an anode 11 and a filamentary-tungsten cathode 12 that are spaced from one another along the longitudinal axis 13 of an air-tight enclosure 14. A metal plate 15, which has a central aperture 16 and is positioned within the enclosure 14 adjacent the cathode 12, carries a series of stainless-steel jigs 17 that are positioned around the axis 13 and have recesses 18 to receive the individual blanks of the batch.

Two toroidally-wound electromagnets 19 and 20 encircle the enclosure 14 coaxially, adjacent the anode 11 and plate 15 respectively, and the whole is embraced by an aluminium framework 21. The framework 21 comprises two aluminium end-pieces 22 and 23 that are of hexagonal form and encircle the enclosure 14 adjacent the magnets 19 and 20 respectively, and six aluminium rods 24 that interconnect the end-pieces 22 and 23 and carry respective toroidal windings 25. The windings 25 are inductively coupled to the closed electrical paths provided by the aluminium framework 21; these paths extend lengthwise of the rods 24 to constitute single-turn secondaries coupled to the windings 25 and adapted to provide a magnetic field acting transversely, and substantially normally, to the electron-beam path along the axis 13.

Before the apparatus is used, its component-parts, together with the blanks and their individual masks, are all thoroughly cleaned. The cleaning process involves firstly the three successive steps of ultrasonic cleaning in a solution of a liquid detergent ("TEEPOL," for example) in de-ionised water, vapour cleaning in trichloroethylene, and vapour cleaning in iso-propyl alcohol. The blanks are then loaded in the recesses 18 of the jigs 17 with the masks clamped tightly to the exposed optically-flat faces. The apparatus is then re-assembled with the jigs 17 in place, all steps in the loading of the jigs 17 and re-assembly of the apparatus being carried out taking care not to handle any of the parts with contaminated tools or uncovered hands.

The enclosure 14 is next sealed and pumped down to a pressure of $2 \times 10^{-6}$ torr by means of a pump (not shown). Argon gas is then admitted through a valve (not shown), spaced in the enclosure 14 from the vent to the pump, so as to sweep through the enclosure 14 (with the pump still running) to increase the pressure to $3 \times 10^{-3}$ torr, and ensure a clean argon atmosphere within the enclosure 14. Under these conditions, voltage (for example, of seventy-five volts) is applied between the anode 11 and cathode 12 sufficient to strike an arc between them to finish the cleaning-up process; no voltage is applied between the cathode 12 and the jigs 17 at this time, so ionic bombardment does not take place. This final step is not regarded as an essential in the cleaning-up process and may well be omitted.

At the end of the cleaning-up process the supply of argon is reduced so that the pressure within the enclosure 14 thereby falls to between $8 \times 10^{-4}$ and $5 \times 10^{-4}$ torr. The six windings 25 are then energized with alternating electric current having a frequency of fifty cycles per second and supplied from a three-phase source, so that the single-turn secondaries provided by the aluminium framework 21 produce a radially-directed magnetic field that rotates about the axis 13. This rotating magnetic field is maintained, and direct current is supplied to each of the electromagnets 19 and 20, throughout the whole sputtering process. During the process the anode 11 is maintained at a positive potential with respect to the cathode 12 so as to set up a substantially cylindrical plasma-column extending lengthwise of the axis 13. The axial magnetic field generated by the electromagnets 19 and 20 provides in this respect a degree of focussing of the electron beam emitted by the cathode 12 (the electromagnet 20 appears also to exert a stabilizing effect on the plasma-column); the action of the rotating magnetic field is to improve the uniformity of bombardment of the blanks.

Voltage, having a value of some six hundred volts, is applied between each jig 17 (and thereby, each of the blanks) and the cathode 12. The sense of application of this latter voltage is such that the blanks are negative with respect to the cathode 12, and accordingly such as to result in ionic bombardment of them from the plasma-column. This bombardment results in sputtering of the wear-resistant material from the exposed areas of the blanks, and such sputtering is continued for a period of some one to two hours to effect removal of material to a depth between $1 \times 10^{-4}$ and $2 \times 10^{-4}$ inches.

Accurate control of depth is obtained simply by regulating the time for which sputtering is continued. When the desired depth has been obtained or has nearly been obtained, there then follows a period, for example, of one half-hour, throughout which the sense of the voltage applied between the blanks and cathode 12 is reversed cyclically. The cyclically-reversing voltage, which may be derived using alternating current having a frequency of fifty cycles per second, has the effect of alternating short intervals of sputtering material from the grooves, with short intervals of deposition of the material therein. There is accordingly a form of averaging-out of material in the bottom of each groove, and this results in a very smooth surface-finish therein.

At the end of the period of cyclic voltage-reversal, all voltages applied to the apparatus are switched off, and the whole then allowed to cool. The enclosure 14 is opened when all is cool, and the sputtered blanks are then removed from the jigs 17 and separated from their masks. After polishing, they are ready for use.

The polishing is applied simply to remove minor surface imperfections caused, for example, by virtue of contact with the mask-material, and consists of rotating the sputtered blanks at high speed in contact with a soft cloth that is impregnated with a very fine diamond compound. The polished plates are ready for use directly in the provision of plate 1 in the bearing, the grooves in these plates having a configuration determined accurately by the masking alone, well-defined side-walls and optically-flat bases. The standard of surface-finish within the grooves is very high and can be expected to approach one-tenth of a light band C.L.A., as compared with one light band C.L.A. where the step of cyclic voltage-reversal is omitted.

The method of manufacturing grooved bearing-parts for a gas-lubricated bearing has been described above only in relation to the flat disc-like plates 1, but this method is equally applicable to the provision of grooves in other than flat surfaces. For example, grooving may be provided in a cylindrical surface by arranging that the suitably-masked cylindrical blank in this case, is rotated to present all exposed portions of the surface successively and repeatedly to ionic bombardment, the enhanced surface-finish then being effected simply by the step of cyclic voltage-reversal as rotation is continued. In this context the method can readily be applied to the formation of grooves in the surface of a spindle used in an aerodynamic gas-lubricated bearing. For example, in the mounting of the gyroscope-rotor referred to above, the grooved thrust-plates provided at either end of the rotor may be clamped to opposite ends of a spindle extending with a small clearance through an axial bore of the cylindrical rotor, the grooved surface 3 of the thrust-plate 1 at each end facing in these circumstances onto the plain, annular face of the rotor at that end, rather than onto the plain surface of the plate 2 described with reference to FIG. 1. The air-pressure that in this arrangement is generated aerodynamically between the internal surface of the bore and the cylindrical surface of the spindle as the rotor rotates, serves to support the rotor clear of the spindle, and stabilization and enhancement of this effect can be achieved using a series of shallow grooves of herringbone pattern distributed around the circumference of the spindle at either end; grooves of this nature, with enhanced surface-finish, can readily be formed as referred to above, by subjecting an appropriately-masked spindle-blank to an extended period of continuous sputtering and then to a period in which sputtering from the blank is alternated with deposition within the grooving.

The material used for the bearing-parts is preferably virtually-pure boron carbide. This material has characteristics well-suited to use in a gas-lubricated bearing; in addition to being very hard, it has extremely good resistance to both corrosion and wear. Blanks of this material are preferably provided in hot-pressed form and machined down using conventional methods to the overall dimensions required, before being submitted to the ionic bombardment necessary for the accurate formation of the grooving. A preferred alternative material is silicon carbide, and there are advantages to be gained from the use of different materials for the opposed bearing-parts. In particular there are advantages in forming one part of boron carbide and the other of silicon carbide. Where, on the other hand, the bearing is for use in the mounting of the rotor of a gyroscope on a gimbal frame, it is advantageous to use either boron or silicon carbide for those bearing-parts carried by the gimbal frame and tungsten carbide for those of the rotor.

Although specific application of the method to the provision of the grooves 5 in the bearing-part 1 has been described, it is nonetheless possible for the method to be applied to the provision of a high degree of finish to the surfaces 3 and 4 of the two bearing-parts 1 and 2. Additionally, the present invention is applicable to the machining of materials whether of electrically conductive, or non-conductive materials. Furthermore, attraction of the ions from the plasma in such method may be effected by means of an alternating electric field (for example of radio-frequency) this technique being applicable especially to those circumstances in which an electrically non-conductive material is involved.

Instead of using a mask to define the regions where the blank is bombarded by the ions as described above, it is possible instead to scan the blank-surface with a beam of ions and cause the bombardment from this to be of significant intensity only where material is to be removed to form the required grooving.

Proposals have been made to use aerodynamic gas-lubricated bearings where, for example, a rotatable shaft is to pass through the wall of an otherwise-sealed vessel, for the purpose of effecting a fluid-tight seal between the rotating shaft and the vessel-wall. Although in these circumstances the gas-pressure generated between the bearing-parts may be used principally for sealing purposes (and indeed rotational support may be achieved in such case by conventional bearings) the action of the device remains essentially the same and is to be understood as providing a gas-lubricated bearing in the context of this specification and the claims thereof.

The method of manufacture of parts of gas-lubricated bearings, in particular the provision of the grooving therein by ionic bombardment, is the subject of our co-pending U.S. patent application Ser. No. 9,728 entitled "Improvements in or Relating to Gas-Lubricated Bearings," filed Feb. 9, 1970.

We claim:

1. A method of machining a workpiece, comprising the step of positioning the workpiece within an enclosure, the step of establishing a gaseous atmosphere of reduced pressure within said enclosure, the step of discharging electrons in said atmosphere to establish a plasma within said enclosure, the step of applying voltage in a sense to attract ions from said plasma to bombard the workpiece for an extended period of time and thereby sputter workpiece material therefrom to a depth dependent on said period, and the step of reversing the sense of the said voltage cyclically throughout a final phase of the sputtering process to sputter material from the workpiece alternately with deposition of this sputtered material back thereon while the voltage sense is reversed, the periodic time of the said cyclic reversals being significantly shorter than said extended period of time.

2. A method according to claim 1 including the step of applying a magnetic field to act substantially normally to the path of the discharged electrons and to rotate relative thereto during the sputtering process.

3. A method according to claim 1 wherein said gaseous atmosphere is of argon.

4. A method of manufacturing a grooved bearing-part of a gas-lubricated bearing comprising the step of submitting a blank of the bearing-part to ionic bombardment to form grooves therein by the sputtering of material from the blank, and the step during a final phase of the method of reversing cyclically the process of sputtering material from the blank so that material is sputtered from, and then alternately therewith, during the reversed sputtering, deposited back on the blank within the grooves.

5. A method according to claim 4 wherein a series of grooves of spiral configuration are formed by the sputtering of material from the blank.

6. A method according to claim 4 including the step of masking a surface of the blank to leave exposed to such bombardment only areas of said surface where grooves are required.

7. A method of manufacturing a grooved bearing-part of a gas-lubricated bearing from a blank, comprising the step of masking a surface of the blank in accordance with the grooving required in the bearing-part, the masking leaving areas of said surface exposed where grooves are required, the step of positioning the masked blank within an enclosure, the step of establishing a gaseous atmosphere of reduced pressure within said enclosure, the step of discharging electrons in said atmosphere to establish a plasma within said enclosure, the step of applying voltage in a sense to attract ions from said plasma to bombard the exposed areas of the masked blank and thereby to sputter material from those exposed areas, and the step of reversing the sense of said voltage cyclically throughout a final phase of the sputtering process to sputter material from the workpiece alternately with deposition of the sputter material back thereon while the voltage sense is reversed.

8. A method according to claim 7 including the step of applying a magnetic field to act substantially normally to the path of the discharged electrons and to rotate relative thereto throughout the sputtering process.

9. A method according to claim 7 wherein said blank is of boron carbide.

10. A method according to claim 7 wherein said blank is of silicon carbide.

11. A method of machining a workpiece comprising
 a first step of submitting the workpiece for an extended period of time to a sputtering process to remove workpiece material therefrom to a depth dependent on the length of said period
 and a subsequent step of polishing the workpiece where material has been removed therefrom during said first step, the polishing step comprising the step of continuing the sputtering process with repeated rapid reversals thereof to deposit material on the workpiece during the periods of reverse sputtering alternately with removal of material therefrom, the source of the deposited material being the workpiece itself and the alternating periods of deposition and removal of material during said polishing step each being significantly shorter than said extended period of time.

12. A method according to claim 11 wherein said first step is performed to form at least one cavity in the workpiece, and wherein the repeated reversal of the sputtering process is applied to remove and deposit material alternately, within the said cavity.

References Cited

UNITED STATES PATENTS

| | | | |
|---|---|---|---|
| 3,479,269 | 11/1969 | Byrnes et al. | 204—192 |
| 3,097,154 | 7/1963 | Eck et al. | 204—192 |
| 3,410,774 | 11/1968 | Barson et al. | 204—192 |
| 3,303,319 | 2/1967 | Steigerwald | 204—192 |
| 2,027,788 | 1/1936 | Ridgway et al. | 23—208 |
| 2,696,413 | 12/1954 | Wheildon | 23—208 |
| 3,445,554 | 5/1969 | Jerome | 23—208 |
| 3,350,182 | 10/1967 | Hunter et al. | 23—208 |

FOREIGN PATENTS

| | | | |
|---|---|---|---|
| 298,535 | 11/1965 | Netherlands | 23—208 |
| 268,786 | 2/1969 | Austria | 341—308 |

JOHN H. MACK, Primary Examiner

S. S. KANTER, Assistant Examiner